US008713193B1

(12) United States Patent
Breau et al.

(10) Patent No.: US 8,713,193 B1
(45) Date of Patent: Apr. 29, 2014

(54) PAUSING MULTIMEDIA DATA STREAMS

(75) Inventors: Jeremy R. Breau, Kansas City, MO (US); Frederick C. Rogers, Olathe, KS (US); Lyle T. Bertz, Lee's Summit, MO (US); William Routt, Leawood, KS (US); Amirali Emami, Vienna, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 927 days.

(21) Appl. No.: 11/938,554

(22) Filed: Nov. 12, 2007

(51) Int. Cl.
*G06F 15/16* (2006.01)
*H04L 29/06* (2006.01)
*H04N 21/433* (2011.01)
*H04N 7/173* (2011.01)

(52) U.S. Cl.
CPC ..... *H04L 29/06176* (2013.01); *H04L 29/06517* (2013.01); *H04N 7/17327* (2013.01); *H04N 21/4333* (2013.01)
USPC ............. 709/231; 369/47.11; 725/36; 725/89

(58) Field of Classification Search
CPC .................................................. H04N 21/4333
USPC ....................................... 709/231; 725/32–36
See application file for complete search history.

(56) References Cited

U.S. PATENT DOCUMENTS

| 5,357,276 | A | * | 10/1994 | Banker et al. ................. 725/102 |
|---|---|---|---|---|
| 6,493,876 | B1 | * | 12/2002 | DeFreese et al. ............. 725/100 |
| 6,754,715 | B1 | * | 6/2004 | Cannon et al. ................ 709/231 |
| 7,023,924 | B1 | * | 4/2006 | Keller et al. ............. 375/240.26 |
| 7,159,231 | B1 | * | 1/2007 | Clark ............................... 725/36 |
| 7,593,326 | B2 | * | 9/2009 | Collet et al. ................... 370/229 |
| 2005/0066353 | A1 | * | 3/2005 | Fransdonk ....................... 725/29 |
| 2005/0223107 | A1 | * | 10/2005 | Mine et al. ..................... 709/231 |
| 2006/0143665 | A1 | * | 6/2006 | Meek et al. ...................... 725/88 |
| 2006/0294557 | A1 | * | 12/2006 | Morris et al. .................... 725/89 |
| 2008/0191816 | A1 | * | 8/2008 | Balachandran et al. ..... 333/24 R |
| 2008/0260117 | A1 | * | 10/2008 | Jackson ..................... 379/88.23 |

OTHER PUBLICATIONS

Internet Engineering Task Force (IETF), RFC 2326, Real Time Streaming Protocol (RTSP), Apr. 1998.*
H. Schulzrinne, A. Rao, R. Lanphier, "Network Working Group, Request for Comments : 2326", Apr. 1998.*
"Request for Comments (RFC) 2326—Real Time Streaming Protocol", H. Schulzrinne, A. Rao, R. Lanphier, Apr. 1998, pp. 1-86.*

* cited by examiner

*Primary Examiner* — Ashok Patel
*Assistant Examiner* — Andrew Goldberg

(57) ABSTRACT

A method, system, and computer-readable media are provided for pausing a multimedia data stream. Techniques are disclosed that include receiving a pause request message, wherein the pause request message includes a sequence number of a last processed media frame within a multimedia data stream when a pause command was issued from a user. Techniques disclosed further include pausing a transmission of the multimedia data stream to a client device. Moreover, the techniques disclosed include determining a time-out value based on one or more local resources of a server, wherein the time-out value corresponds to a length of time the media stream can be paused. Furthermore, the techniques disclosed include creating a timestamp of when the transmission of the media stream was paused. Additionally, the techniques disclosed include sending the time-out value and the timestamp to the client device.

14 Claims, 6 Drawing Sheets

PAUSING MULTIMEDIA DATA STREAMS

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is defined by the claims below. Embodiments of the present invention solve at least the above problems by providing a system and method for, among other things, pausing a multimedia data stream.

In a first aspect, a set of computer-readable media provides a method that includes receiving a pause request message, wherein the pause request message includes a sequence number of a last processed media frame within a multimedia data stream when a pause command was issued from a user. The method further includes pausing a transmission of the multimedia data stream to a client device. Moreover, the method includes determining a time-out value based on one or more local resources of a server, wherein the time-out value corresponds to a length of time the multimedia data stream can be paused. Furthermore, the method includes creating a timestamp of when the transmission of the multimedia data stream was paused. Additionally, the method includes sending the time-out value and the timestamp to the client device.

In a second aspect, a set of computer-readable media provides another method that includes sending a pause request message to a server to pause the transmission of a multimedia data stream, wherein the pause request message corresponds to a pause command issued by a user. The method further includes receiving a timestamp and a time-out value from the server, wherein the timestamp corresponds to when the server paused the multimedia data stream and the time-out value corresponds to a length of time the server will pause the transmission of the multimedia data stream. Furthermore, the method includes calculating an unpause time value based on the timestamp and the time-out value, wherein the unpause time value corresponds to a time when the server will unpause the multimedia data stream. Moreover, the method includes providing one or more alerts before the unpause time value occurs informing a user of the unpause time value.

In a third aspect, a system is provided that includes a server for receiving a pause request message to pause a multimedia data stream, pausing the multimedia data stream, and generating a pause reply message that includes a timestamp of when the multimedia data stream was paused and a time-out value corresponding to a length of time the server can pause the multimedia data stream. The system further includes a client for creating the pause request message, receiving the pause reply message, calculating an unpause time value based on the timestamp and the time-out value, the unpause time value corresponding to when the server will unpause the multimedia data stream, and providing one or more alerts before the unpause time value occurs informing a user of the unpause time value.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Various technical terms are used throughout this description. A definition of such terms can be found in Newton's Telecom Dictionary by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media which includes computer-storage media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
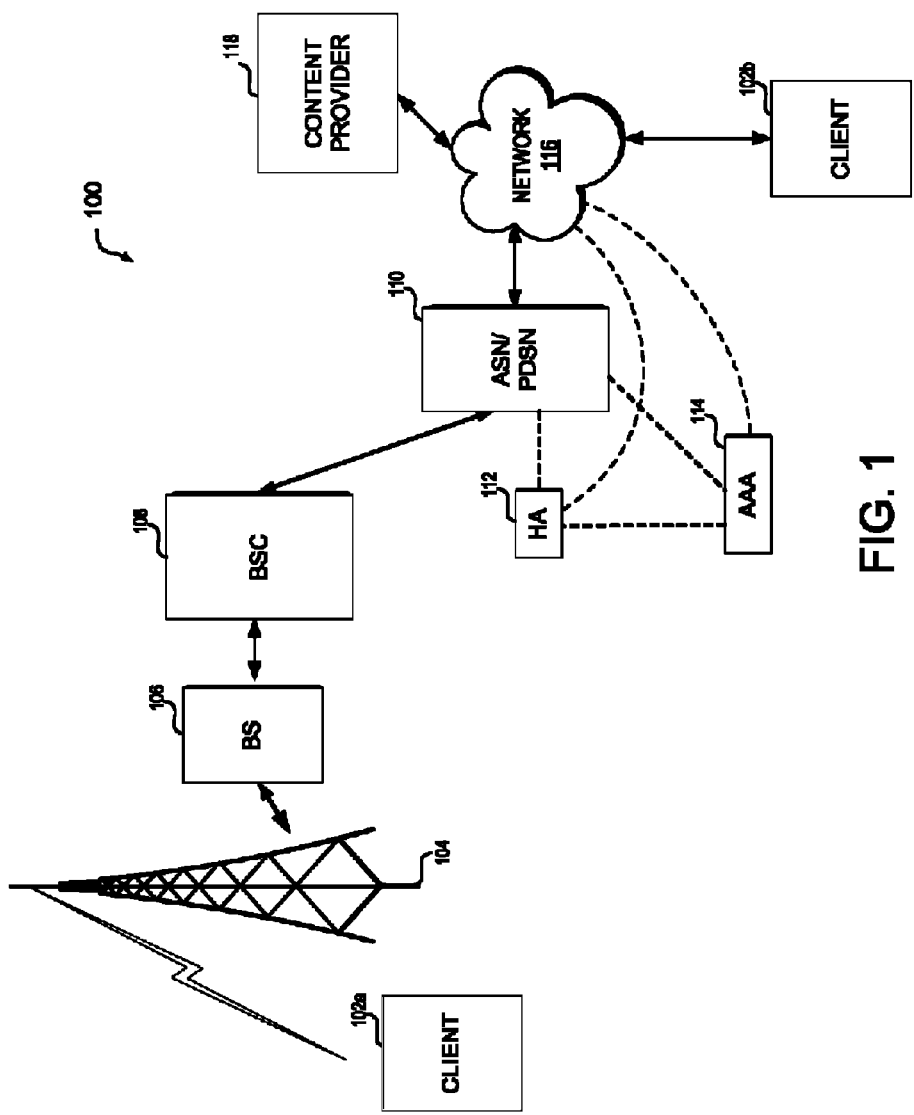
FIG. 1 is a block diagram of an exemplary system for implementing an embodiment of the invention.

FIG. 1 is a block diagram of an exemplary system 100 for implementing an embodiment of the invention. The system 100 includes client 102 (102a and 102b), content provider 118, network 116, and wireless communication service provider components 104, 106, 108, 110, 112, and 114. Client 102 and content provider 118 each include a communication interface. The communication interface may be an interface that can allow the client 102b and content provider 118 to be directly connected to each other or allows the client 102b and content provider 118 to be connected to each other over network 116. Network 116 can include, for example, a local area network (LAN), a wide area network (WAN), or the Internet. In an embodiment, the client 102a and content provider 104 can be connected to each other through a wireless communication interface through network 116 using wireless communication service provider components 104, 106, 108, 110, 112, and 114.

Content provider 118 may be or can include a server such as a workstation running the Microsoft Windows®, MacOS™, Unix™, Linux™, Xenix™, IBM AIX™, Hewlett-Packard UX™, Novell Netware™, Sun Microsystems Solaris™, OS/2™, BeOS™, Mach™, Apache™, OpenStep™ or other operating system or platform. Content provider 118 is configured to provide a plurality of different types of multimedia content, including video, audio, and text data, to one or more client devices 102. In an embodiment, content provider 118 can provide real-time streaming delivery of multimedia content over Internet Protocol (IP) via network 116. In an embodiment, content provider 118 may be a television program provider that provides television programming to client 102. In another embodiment, content provider 118 may be a Voice-over IP (VoIP) provider for facilitating phone calls between two or more clients 102.

Client 102 may be or can include a desktop computer, a laptop computer or other mobile computing device, an audio/video set-top box, a network-enabled cellular telephone (with or without media capturing/playback capabilities), wireless email client, or other client, machine or device to perform various tasks including Web browsing, search, electronic mail (email) and other tasks, applications and functions. Client 102 may additionally be any portable media device such as digital still camera devices, digital video cameras (with or without still image capture functionality), media players such as personal music players and personal video players, and any other portable media device.

The Base Station (BS) 106 contains equipment for transmitting and receiving of radio signals from a communication tower 104. BS 106 also has other equipment for encrypting and decrypting communication with the Base Station Controller (BSC) 108. The BSC 108 may be configured to receive radio signals that are converted into Time Division Multiplexing (TDM) from a BS 106. In an embodiment, the BSC 108 can have a plurality of BSs under its control. The BSC 108 may handle the allocation of radio channels, may receive measurements from mobile devices, and can control handovers from one BS to another BS. Another function of the BSC 108 is to act as a concentrator of communication sessions where many different low capacity connections to the BSs (with relatively low utilization) become reduced to a smaller number of connections toward a Mobile Switching Center (MSC) (with a high level of utilization). The BSC may also be configured to send voice information from the TDM signal to the MSC and data information to an Access Service Network (ASN) or a Packet Data Serving Node (PDSN) 110.

The ASN/PDSN 110 may be a component of a mobile network. The ASN/PDSN 110 may act as a connection point between the Radio Access and Internet Protocol (IP) networks. The ASN/PDSN 110 component may be responsible for managing Point-to-Point Protocol (PPP) sessions between the mobile device's core IP network and the mobile device. The Home Agent (HA) 112 may be a router located in a home network of the mobile device 102 for Global System for Mobile Communication (GSM) and Code Division Multiple Access (CDMA) or over Generic Routing Encapsulation (GRE) for the Worldwide Interoperability for Microwave Access (WiMAX) networks. The HA 112 allows a mobile device to connect to the Internet or data network by assigning an IP address and binding it to a Care-of-Address (COA). The HA 112 can forward packets to an appropriate network when a mobile device is away from its home area or home network. An authentication, authorization, and accounting (AAA) server 114 is a server program that handles user requests for access to a network and provides AAA services. The AAA server 114 may interact with network access servers, gateway servers, databases, and directories containing user information.

In FIG. 1, various wireless networks may be implemented in various embodiments of the present invention. FIG. 1 and the remaining figures discuss concepts related to GSM and CDMA. However, concepts and components related to WiMAX, Wideband CDMA (W-CDMA), and CDMA2000 are within the scope of the invention even if not particularly referred to in the discussion. For example, in GSM and CDMA, a BSC and BS exist. In WiMAX, a BS and ASN-GW (Gateway) exist. In W-CDMA and CDMA2000, an Radio Network Controller (RNC) and Node-B exists. One of ordinary skill in the art understands these components in their respective networks and their relationship to each other.

Figure 2:
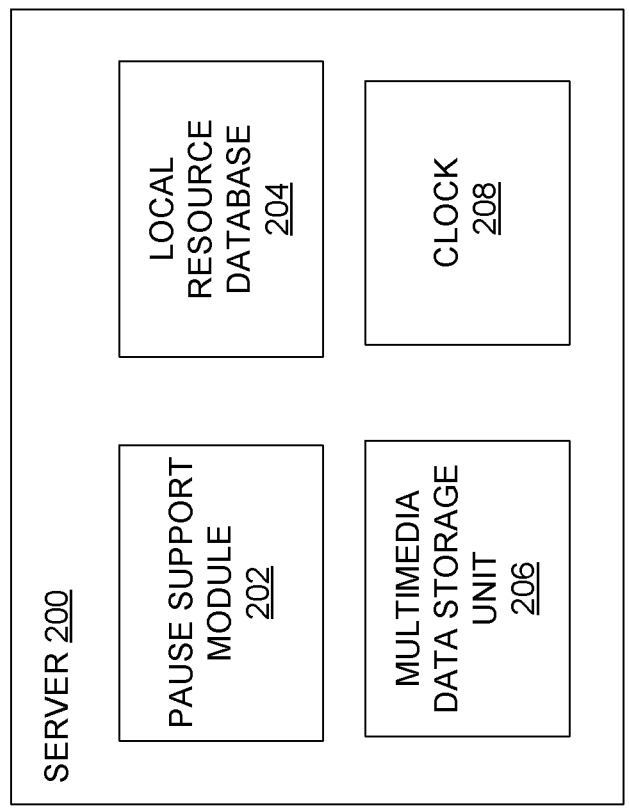
FIG. 2 is a block diagram of a server for pausing a transmission of a multimedia data stream according to an embodiment of the invention.

FIG. 2 is a block diagram of a server 200 for pausing a multimedia data stream according to an embodiment of the invention. In an embodiment, server 200 may be a content provider such as content provider 118. In another embodiment, server 200 may be a component of a wireless communication service provider that communicates with one or more content providers 118. In yet another embodiment, server 200 may be a third party server that communicates with one or more content providers 118 and one or more components of a wireless communication service provider.

Server 200 may include pause support module 202, local resource database 204, multimedia data storage unit 206, and clock 208. In an embodiment, one or more elements of server 200, such as elements 202, 204, 206, and 208, may be external and accessible to server 200. Pause support module 202 is a computer hardware or software component that is utilized to receive a pause request message from a client device. The pause support module 202 may also be configured to execute operations necessary to complete a successful pause of a transmission of a multimedia data stream being sent to the client device.

Figure 3:
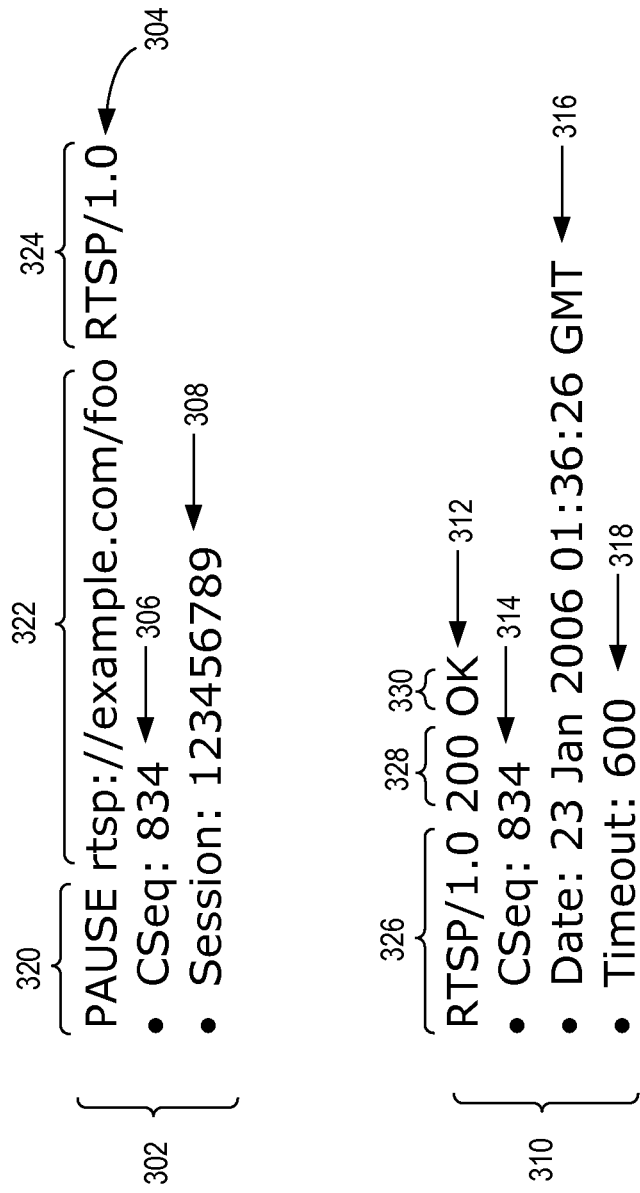
FIG. 3 is an illustration of a pause request message received from a client device and a pause reply message sent from the server according to an embodiment of the invention.

FIG. 3 is an illustration of a pause request message 302 received from a client device and a pause reply message 310 sent from the server 200 according to an embodiment of the invention. In an embodiment, the client and server 200 exchange multimedia data using the Real-time Transport Protocol (RTP). RTP defines a standardized packet format for delivering multimedia data over the Internet. The RTP, the Real-time Transport Control Protocol (RTCP), and the Real Time Streaming Protocol (RTSP) are commonly used together. RTCP provides out-of-band control information for an RTP flow. RTCP partners with RTP in the delivery and packaging of multimedia data. RTCP is used periodically to transmit control packets to participants in a streaming multimedia session. A primary function of RTCP is to provide feedback on the quality of service being provided by RTP. RTSP is a protocol for use in streaming media systems which allows a client to remotely control a streaming media server by issuing commands such as "play" and "pause." RTSP can also be used to allow time-based access to files on a server.

In an embodiment, the pause request message 302 received by the server 200 from a client device comprises three different header sections. The first header 304 includes a pause command 320, a Uniform Resource Locator (URL) of the multimedia data stream that needs to be paused 322, and the RTSP version identifier 324 being used. The second header 306 includes a sequence number of the last media frame that was played in the client device when the user issued the pause command. The third header 308 includes the RTSP session identifier of the multimedia data stream.

The pause support module 202 receives the pause request message 302 and determines the amount of time it can pause the multimedia data stream for the user of the client device. In an embodiment, the pause support module 202 makes this determination based on current network conditions rather than the network conditions at the time of an initial RTSP set-up phase. In order to determine how long the server 200 can pause the multimedia data stream based on current network conditions, the pause support module 202 can look at the server 200's local resources 204. In an embodiment, the local resources vary depending on the current network conditions. Local resources can include, but are not limited to, the current disk storage space on the server, quality of the transmission of the multimedia data stream, and the service plan purchased by a user. In an embodiment, a higher-level service plan may allow the user to have the server 200 pause a multimedia data stream longer than a user with a lower-level service plan.

In an embodiment, the pause support module 202 can input various parameters of local resources into an algorithm to determine the length of time the server 200 can pause the client's multimedia data stream. Once the pause support module 202 determines the length of time, it can instruct the server 200 to begin storing the multimedia data stream in multimedia data storage unit 206.

In an embodiment, the server 200 can obtain a buffer size of a client device during an initial RTSP set-up phase. When storing the multimedia data stream, the pause support module 202 may have to take into consideration the buffer size of the client device. For example, if the pause support module 202 knows that the client device has a buffer size of ten frames and that the client device paused at frame 834, the pause support module then knows that the client device can hold an additional ten frames up to frame 844 and that the pause support module 202 has to begin storing the multimedia data stream at frame 845. Once the server has paused the transmission of the multimedia data stream, the pause support module 202 can proceed to transmit a pause reply message 310 to the client device to inform it of the successful pausing of the multimedia data stream.

In an embodiment, the pause reply message 310 includes four different header sections. The first header 312 includes the RTSP version identifier 326 being used, a numeric command code 328 that identifies the pause was successful, and the short name 330 of the numeric command code 328. The second header 314 of the pause reply includes the sequence number that acknowledges the server 200's understanding of the frame at which the client device paused. The third header 316 includes a timestamp of when the server 200 paused the multimedia data stream. The pause support module 202 may look to server's internal clock 208 to determine the time at which the multimedia data stream was paused. In an embodiment, the clock 208 may be set according to the Universal Time Code (UTC). The fourth header 318 may include a time-out value corresponding to the length of time the server 200 can pause the multimedia data stream for the client device. In an embodiment, the time-out value may be a numeric value of seconds. Once the pause reply message 310 has been created, the server 200 can transmit the pause reply message 310 to the client device.

Figure 4:
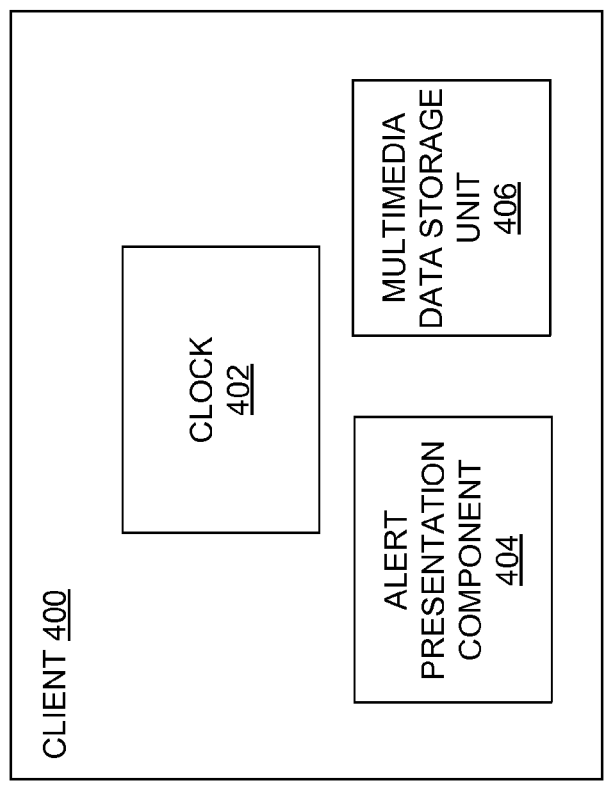
FIG. 4 is a block diagram of a client according to an embodiment of the invention.

FIG. 4 is a block diagram of a client 400 according to an embodiment of the invention. Once the client 400 receives a pause reply message 310 from the server 200, the client 400 can look at the timestamp within the third section 316 of the pause reply message 310 to determine if it needs to synchronize its local clock 402 with the server's internal clock 208. The client 400 can initially make note of the time when the user executes a pause command at the client by using the local clock 402. The client 400 can estimate a time when it expects the server 200 to pause the multimedia data stream and create a timestamp corresponding to the pause based on the time the user paused the multimedia data stream at the client device, the time the client sent the pause request message 302, and the time it would typically take the server 200 to process a pause request message 302 based on the current network conditions. In an embodiment, if the estimated time is greater or less than a threshold amount of time from the timestamp received within the pause reply message 310, the client 400 can synchronize its local clock 402 with the server's internal clock 208. It is noted that the client and server may use third-party synchronization mechanisms like the Network Time Protocol (NTP) or other clock synchronization services like those provided in GSM or CDMA to synchronize.

The alert presentation component 404 of client 400 is a computer software or hardware component that identifies the time-out value within the pause reply message 310 and determines, based on the time-out value, the time at which the server 200 will unpause the multimedia data stream. For example, referring to FIG. 3, since the time-out value is 600, the alert presentation component 404 can determine that the server will unpause the multimedia data stream 600 seconds from 01:36:26 Greenwich Mean Time (GMT) which would be at 01:46:26 GMT. The alert presentation component 404 can be configured to periodically present alerts via the client device 400 to inform the user of when the server 200 will unpause the multimedia data stream. For example, the alert presentation component can present an alert at one quarter of the way into pausing the multimedia data stream, halfway into pausing the multimedia data stream, three-quarters of the way into pausing the multimedia data stream, and one minute before the server 400 unpauses the multimedia data stream. The alert may be, for example, an audio alert, a visual alert, or a vibrating alert. In an embodiment, if the user has not taken action to unpause the multimedia data stream before the server automatically unpauses the stream, the client 400 can be configured to automatically store the multimedia data stream in multimedia data storage unit 406.

In instances where the client 400 is connected to server 200 via WiMAX technology, other factors may need to be taken into consideration. Typically, there is a quality of service agreement in WiMAX between a client 400 and a BS such as BS 106 that requires the client 400 to maintain transmission of a minimum bit rate during a communication session. However, pausing a multimedia data stream effectively violates the agreement as the client is no longer transmitting bits during the pause.

One solution contemplated by the invention would be to have the server 200 deactivate the transport connection associated with a service flow between the client device and the BS when the client sends a pause request message 302. When then the transport connection is deactivated, the BS ignores the quality of service agreement and thus the minimum bit rate does not need to be maintained. By not enforcing the minimum bit rate, the client device 400 would be free to pause a multimedia data stream without being in violation of the quality of service agreement. When the user decides to unpause the multimedia data stream, the server 200 can simply reactivate the transport connection.

Another solution contemplated by the invention would be to have a network operator, component, or other entity change the minimum bit rate in the quality of service agreement to zero. To accomplish this task, the network operator, component, or other entity can access the service flow administrator associated with the client's service flow to allow the minimum bit rate to be changed to zero. This can effectively configure the BS to allow the client device to maintain a minimum bit rate of zero. When the server 200 is ready to unpause the transmission of the multimedia data stream, the network operator, component, or other entity can access the service flow administrator to readjust the service flow back to the original minimum bit rate.

Figure 5:
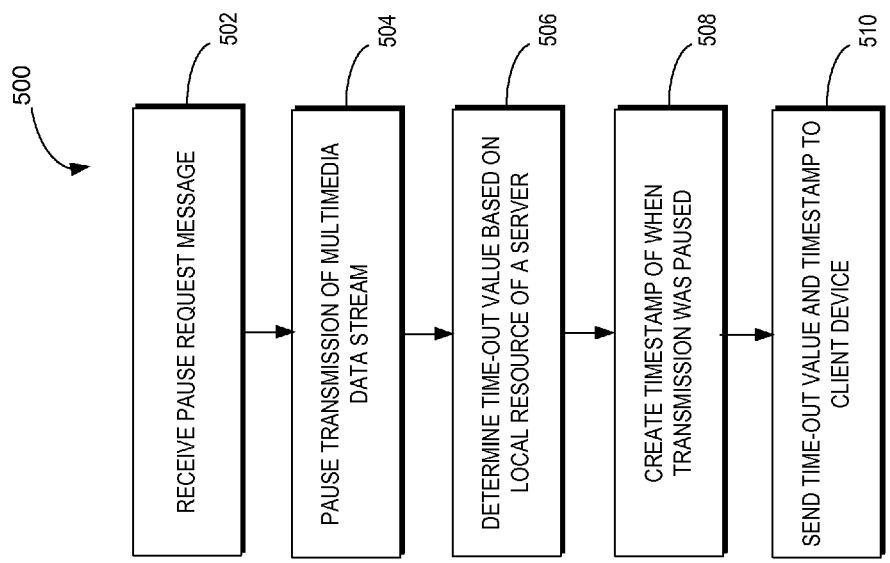
FIG. 5 is a flow diagram of an exemplary method for pausing a multimedia data stream according to an embodiment of the invention.

FIG. 5 is a flow diagram of an exemplary method 500 for pausing a multimedia data stream according to an embodiment of the invention. At operation 502, a pause request message is received. In an embodiment, the pause request message includes a sequence number of a last processed media frame within the multimedia data stream when a pause command was issued from a user. At operation 504, a transmission of the multimedia data stream to a client device is paused. At operation 506, a time-out value based on one or more local resources of a server is determined. In an embodiment, the time-out value corresponds to a length of time the media stream can be paused. At operation 508, a timestamp of when the transmission of the media stream was paused is created. At operation 510, the time-out value and the timestamp is sent to the client device.

Figure 6:
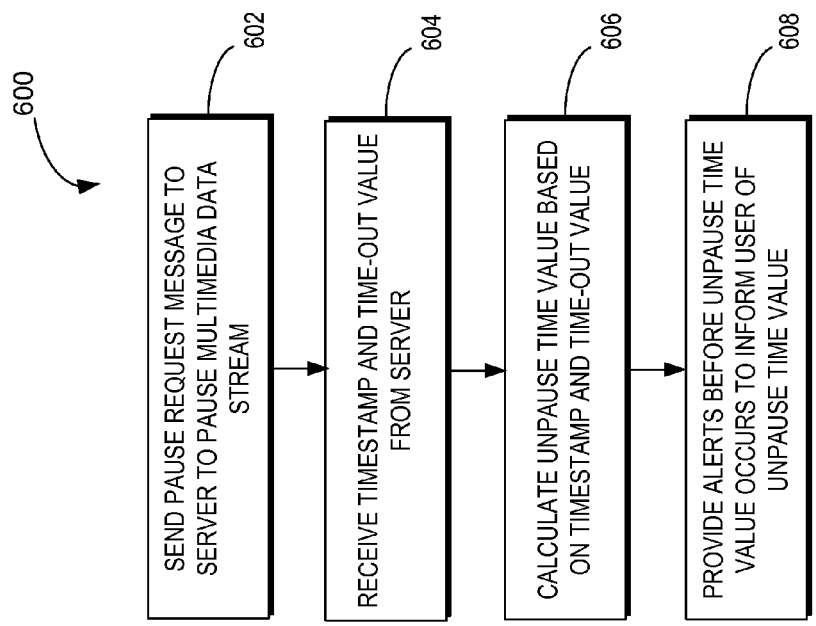
FIG. 6 is a flow diagram of another exemplary method for pausing a multimedia data stream according to an embodiment of the invention.

FIG. 6 is a flow diagram of another exemplary method 600 for pausing a multimedia data stream according to an embodiment of the invention. At operation 602, a pause request message is sent to a server to pause the transmission of a multimedia data stream. In an embodiment, the pause request message corresponding to a pause command issued by a user. At operation 604, a timestamp and a time-out value are received from the server. In an embodiment, the timestamp corresponds to when the server paused the multimedia data stream and the time-out value corresponds to how long the server will pause the transmission of the multimedia data stream. At operation 606, an unpause time value is calculated based on the timestamp and the time-out value. In an embodiment, the unpause time value corresponds to when the server will unpause the multimedia data stream. At operation 608, one or more alerts are provided before the unpause time value occurs informing a user of the unpause time value.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method for pausing a multimedia data stream, the method comprising:

receiving by a server, a real time streaming protocol (RTSP) comprising a pause request message from a client device, wherein the pause request message comprises a pause command, a uniform resource locator of the multimedia data stream, and a sequence number of a last processed media frame within the multimedia data stream when the pause command was issued from a user;

pausing, by the server, a transmission of the multimedia data stream to the client device;

determining, by the server, a length of time the multimedia data stream is paused based on a current disk storage space of a server, a quality of a transmission of the multimedia data stream of the server, and a service plan of the user, wherein the length of time the multimedia data stream is paused varies depending on a network condition;

creating, by the server, a timestamp of when the transmission of the multimedia data stream was paused;

sending, by the server, a pause reply message to the client, the pause reply message comprising the time-out value, the timestamp, and the sequence number;

requesting, by the server, a reduction of a minimum data rate of communication, when pausing the transmission of the multimedia data stream to the client device and when the minimum data rate of communication is required storing frames of the multimedia data stream when the multimedia data stream is paused, wherein the frames are stored based on the sequence number and a buffer size of the client device;

calculating an unpause time value based on the timestamp and the time-out value, wherein the unpause time value is a time when the multimedia data stream will be unpaused; and unpausing the multimedia data stream when the unpause time value is reached.

2. The media according to claim 1, wherein the multimedia data stream is transmitted using Worldwide Interoperability for Microwave Access technology.

3. The media according to claim 2, wherein requesting reduction of a minimum data rate of communication comprises deactivating a transport connection when the pause request message is received.

4. The media according to claim 3, wherein the transport connection is associated with a service flow between the client device and a base station.

5. The media according to claim 2, wherein requesting reduction of a minimum data rate of communication comprises modifying a base station to allow a minimum bit rate of zero in order to pause the transmission of the multimedia data stream.

6. The media according to claim 5, wherein a service flow administrator is accessed in order to modify the base station.

7. One or more non-transitory computer-readable media having computer-useable instructions embodied thereon for performing a method for pausing a multimedia data stream, the method comprising:

sending, by a client device, a real time streaming protocol (RTSP) message comprising a pause request message to a server to pause the transmission of a multimedia data stream, the pause request message comprising a pause command issued by a user, a uniform resource locator of the multimedia data stream, and a sequence number of a last processed media frame within the multimedia data stream;

receiving, by the client device, a pause reply message from the server, wherein the pause reply message includes a timestamp, a time-out value, and a sequence number, wherein the timestamp corresponds to when the server paused the multimedia data stream and the time-out value corresponds to a length of time the server pauses the transmission of the multimedia data stream, and wherein the time-out value varies depending on a network condition;

calculating an unpause time value based on the timestamp and the timeout value, the unpause time value corresponding to a time when the server will unpause the multimedia data stream;

providing one or more alerts before the unpause time value occurs informing a user of the unpause time value; and automatically recording the multimedia data stream, when the unpause time value is reached and the client device has not taken an action to unpause the multimedia data stream, wherein the client device was not previously recording the multimedia data stream when the unpause time value was reached.

8. The media according to claim 7, further comprising:
estimating an expected timestamp; and
synchronizing a time code of the client device according to the timestamp if the expected timestamp is a threshold amount of time away from the timestamp.

9. The media according to claim 7, wherein the one or more alerts are at least one of an audio alert, a video alert, and a vibrating alert.

10. The media according to claim 7, wherein the pause request message includes a Uniform Resource Locator of the multimedia date stream, a sequence number of the last media frame played in a client device when the user issued the pause command, and a session identifier of the multimedia data stream.

11. A system for pausing a multimedia data stream, comprising:
a server configured to
receive a real time streaming protocol (RSTP) message comprising pause request message to pause the multimedia data stream wherein the pause request message includes a pause command, a uniform resource locator of the multimedia data stream, and a sequence number of a last processed media frame within the multimedia data stream when a pause command was issued from a user, pause the multimedia data stream for a length of time based on a current disk storage space of a server, a quality of a transmission of the multimedia data stream of the server, and a service plan of the user, generate a pause reply message that includes a timestamp of when the multimedia data stream was paused and a time-out value corresponding to a length of time the server can pause the multimedia data stream wherein the timeout value varies depending on a network condition, request a reduction of a minimum data rate of communication, when pausing the transmission of the multimedia data stream to the client device and when the minimum data rate of communication is required, store frames of the multimedia data stream when the multimedia data stream is paused, wherein the frames are stored based on the sequence number and a buffer size of the client device, calculate an unpause time value based on the timestamp and the time-out value, wherein the unpause time value is a time when the multimedia data stream will be unpaused, and unpause the multimedia data stream when the unpause time value is reached; and a client configured to
create the pause request message,
receive the pause reply message,
calculate an unpause time value based on the timestamp and the timeout value, the unpause time value corresponding to when the server will unpause the multimedia data stream, and
provide one or more alerts before the unpause time value occurs informing a user of the unpause time value.

12. The system according to claim 11, wherein the time-out value is based on one or more local resources of the server.

13. The system according to claim 11, wherein the server unpauses the multimedia data stream when the unpause time value is reached.

14. The system according to claim 11, wherein the client automatically records the multimedia data stream when the unpause time value is reached and the client has not taken an action to unpause the multimedia data stream.

* * * * *